United States Patent
Jaggers et al.

(10) Patent No.: US 7,076,270 B2
(45) Date of Patent: Jul. 11, 2006

(54) DOCKING STATION FOR WIRELESS COMMUNICATION DEVICE

(75) Inventors: Christopher M. Jaggers, Austin, TX (US); Robert L. McMahan, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 972 days.

(21) Appl. No.: 09/796,041

(22) Filed: Feb. 28, 2001

(65) Prior Publication Data

US 2002/0119800 A1 Aug. 29, 2002

Related U.S. Application Data

(63) Continuation of application No. 09/796,041, filed on Feb. 28, 2001.

(51) Int. Cl.
*H04B 1/38* (2006.01)

(52) U.S. Cl. ............... 455/556.1; 455/557; 455/569.1; 455/349; 379/428.04; 379/428.83

(58) Field of Classification Search ............. 455/550.1, 455/575.1, 346, 347, 344, 554.1, 418, 90.3, 455/349, 412, 462, 466, 556, 348, 534.1, 455/552.1, 3.04, 573, 553.1, 556.1, 566, 455/572, 574, 556.2, 557, 414, 569.1, 74.1, 455/555, 561, 424, 425, 456.5, 456.6; 395/828, 395/275; 710/1, 8, 13, 104, 303, 62, 65, 710/69, 70, 71, 63, 72, 18; 361/686, 683, 361/724–727, 679; 364/708.1; 340/825.44; 379/428.04, 428.03, 420.04, 446, 455, 454, 379/437.04

See application file for complete search history.

(56) References Cited

U.S. PATENT DOCUMENTS

| | | | |
|---|---|---|---|
| 4,958,368 A | 9/1990 | Parker | 379/91 |
| 5,313,596 A | 5/1994 | Swindler et al. | 395/325 |
| 5,315,638 A | 5/1994 | Mukari | 379/58 |
| 5,396,400 A | 3/1995 | Register et al. | 361/686 |
| 5,402,310 A | 3/1995 | Penniman | 361/686 |
| 5,414,753 A | 5/1995 | Ehara | 379/58 |
| 5,452,180 A | 9/1995 | Register et al. | 361/686 |

(Continued)

OTHER PUBLICATIONS

U.S. Appl. No. 09/128,044, filed Aug. 3, 1998 entitled "Computer Docking Guidance System" by Howell, et al.

(Continued)

*Primary Examiner*—Edward F. Urban
*Assistant Examiner*—Charles Chow
(74) *Attorney, Agent, or Firm*—Haynes and Boone, LLP (57) ABSTRACT

A docking station for a wireless communications device includes a support structure that includes a cradle for the wireless telephone. The docking station includes a switch, sensor or other detection mechanism that detects when the wireless communication device is docked. When the wireless communication device is docked, the detection mechanism sends a signal to the wireless communication device. A set of instructions stored in the processor determines which display and which input to use, depending on whether or not the signal is received from the detection mechanism. Embodiments include a display, USB hub, and modem in the docking station. Another embodiment includes a USB connector in the wireless communication device. Finally, an embodiment includes a docking station with equivalent features for a cellular telephone or Personal Digital Assistant (PDA).

20 Claims, 7 Drawing Sheets

U.S. PATENT DOCUMENTS

| | | | |
|---|---|---|---|
| 5,526,493 A | 6/1996 | Shu | 395/281 |
| 5,552,959 A | 9/1996 | Penniman et al. | 361/686 |
| 5,568,359 A | 10/1996 | Cavello et al. | 361/386 |
| 5,579,528 A | 11/1996 | Register | 395/671 |
| 5,699,226 A | 12/1997 | Cavello | 361/686 |
| 5,812,356 A | 9/1998 | O'Connor | 361/179 |
| 5,818,691 A | 10/1998 | McMahan et al. | 361/686 |
| 5,822,185 A | 10/1998 | Cavello | 361/686 |
| 5,940,767 A * | 8/1999 | Bourgeois et al. | 455/466 |
| 5,964,847 A * | 10/1999 | Booth et al. | 710/1 |
| 5,969,939 A | 10/1999 | Moss et al. | 361/686 |
| 5,991,838 A | 11/1999 | Swindler et al. | 710/101 |
| 6,011,687 A | 1/2000 | Gluskoter et al. | 361/686 |
| 6,018,656 A | 1/2000 | Shirai | 455/422 |
| 6,023,411 A | 2/2000 | Howell et al. | 361/686 |
| 6,049,454 A | 4/2000 | Howell et al. | 361/686 |
| 6,069,790 A | 5/2000 | Howell et al. | 361/686 |
| 6,222,728 B1 | 4/2001 | Jaggers et al. | 361/686 |
| 6,407,914 B1 * | 6/2002 | Helot | 361/686 |
| 6,477,588 B1 * | 11/2002 | Yerazunis et al. | 710/13 |
| 6,654,826 B1 * | 11/2003 | Cho et al. | 710/62 |
| 6,678,535 B1 * | 1/2004 | Narayanaswami | 455/557 |
| 6,704,580 B1 * | 3/2004 | Fintel | 455/550.1 |
| 2002/0103008 A1 * | 8/2002 | Rahn et al. | 455/557 |
| 2002/0119800 A1 * | 8/2002 | Jaggers et al. | 455/550 |

OTHER PUBLICATIONS

U.S. Appl. No. 09/169,943, filed Jan. 26, 2001 entitled "Portable Cell Phone Docking System" by Christopher M. Jaggers and Robert L. McMahan.

* cited by examiner

DOCKING STATION FOR WIRELESS COMMUNICATION DEVICE

CROSS REFERENCE TO RELATED APPLICATIONS

This application relates to, and claims benefit of, co-pending U.S. patent application Ser. No. 09/769,943, filed on Jan. 26, 2001, entitled "Portable Cell Phone Docking System," naming Christopher M. Jaggers and Robert L. McMahan as inventors and assigned to the same assignee as this application, the application being incorporated herein by reference in its entirety.

BACKGROUND

This disclosure relates to a docking station for wireless communication devices and, more particularly, to technology for enhancing the capabilities of wireless communications devices, such cellular of PCT telephones, so as to more closely approach the capabilities of personal computers, especially as those capabilities relate to enablement of Internet access or access to other sources of data or information.

1. Field of the Invention

The invention relates a docking station for wireless communication devices and, more particularly, to technology for enhancing the capabilities of wireless communications devices, such cellular or PCS telephones, so as to more closely approach the capabilities of personal computers, especially as those capabilities relate to enablement of Internet access or access to other sources of data or information.

2. Description of the Related Art

The personal computer (PC) industry is experiencing a change in the manner in which PCs are used. During earlier stages in the rise of PC popularity, PCs were primarily looked to for their computational capacity. Subsequently, word processing, spreadsheet, database and presentation applications began to assume the forefront. Still more recently, the PC has come to be seen as a communications device, and has experienced rapidly expanding use as a communications terminal from which to send and receive electronic messages. Along these lines, consumer acquisitions of PC's have lately been stimulated by the objective of using the PC simply as an appliance to access the Internet. In this mode, much of the embedded capability of the PC lies dormant, and PC users tend to become preoccupied with information transmission bandwidth, rather than processing power or expandability.

Concurrently, the proliferation of wireless communications devices, such as cellular telephones, has accelerated to the point that cellular telephones appear ubiquitous and are predicted by some to ultimately displace wired communications facilities. In fact, cellular telephone sales now exceed sales of PCs by a margin of approximately 2 to 1, and it is anticipated that this margin will expand.

As technology has evolved, cellular functionality has become correspondingly more robust, and cellular phones now offer capabilities that were once the exclusive province of PCs. In fact, some cellular telephones now resemble small, low-end PCs with wireless access to data networks, including the Internet. Computers for organizing telephone numbers and appointments are referred to as Personal Digital Assistants (PDAs). PDAs are also available with wireless access to the Internet. Ironically, many consumers are now believed to acquire cellular telephones and other wireless communication devices merely as an Internet-access appliance.

Cellular telephones, hand-held computers, PDAs and other wireless communication devices are burdened by a number of characteristics that render them substantially less than ideal for applications such as Internet access. Perhaps paramount among the shortcomings of wireless communication devices and cellular telephones is the incommodious user interface they present. Specifically, cellular telephones are often slow to access information from the Internet.

The Internet is a collection of interconnected computers providing access to hundreds of millions of documents. These documents are written in HyperText Markup Language, or HTML. HTML supports hypertext which allows a user to create a link in a Web page that allows the user to conveniently connect to another Web page. Connecting to a Web page on a desktop or portable computer allows a user to view or download the web page. Many users also user and Internet connection to support access to email which quickly sends and receives text messages and attachments.

Unlike desktop or portable computers, present-day cellular telephones fail to include keyboards and printers. Also the display on a wireless communication device is often much smaller than a display used with a conventional desktop or portable computer. The smaller display and lack of other user interfaces renders cellular telephones and other wireless communications devices unsuitable as an interface to all but the most primitive sources of information from the Internet.

Co-pending U.S. Patent pplication Ser. No. 09,769,943, titled "Portable Cell Phone Docking System" filed on Jan. 26, 2001 on behalf of the same inventors, and assigned to the same assignee as this application (and hereby incorporated by reference in its entirety) teaches a docking system that enables cellular telephones to operate as a convenient device for enabling the computing power available in a cellular telephone without compromising the utility of the cellular telephone as a portable communication device. But the pending application does not teach a signal operative to determine the format of a data stream in the wireless communication device. What is needed is a solution which enhances existing wireless communication device capabilities by utilizing capabilities and features available in the docking station when the cellular telephone is docked. Preferably the solution will promote the cellular telephone as a viable alternate to low-end PCs that are primarily acquired for use as Internet-access terminals.

SUMMARY

The above objects, advantages and capabilities are achieved by a docking station for a wireless communications device. The present disclosure teaches a docking station for a wireless communications device. The docking station includes a support structure that includes a cradle for the wireless telephone. The docking station includes a switch, sensor or other detection mechanism. The detection mechanism detects when the wireless communication device is docked. When the wireless communication device is docked the detection mechanism sends a signal to the wireless communication device. A set of instructions stored in the processor determines which display to use and which input to use, depending on whether or not the signal is received from the detection mechanism. A connector provides connections to peripheral devices including a display, printer, monitor and keyboard.

Embodiments include a display, USB hub, and modem in the docking station. Another embodiment includes a USB connector in the wireless communication device. A video camera for video conferencing may also be interfaced to the wireless communication device. An embodiment teaches a docking station with similar features for a cellular telephone or Personal Digital Assistant (PDA). The foregoing is a Summary and this contains, by necessity, simplifications, generalizations and omissions of detail; consequently, those skilled in the art will appreciate that the summary is illustrative only and is not intended to be in any way limiting.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates identical items unless otherwise noted.

DETAILED DESCRIPTION OF THE DRAWINGS

The following is intended to provide a detailed description of an example of the disclosure and should not be taken to be limiting of the disclosure itself. Rather, any number of variations may fall within the scope of the disclosure defined in the claims following the description. FIG. 1 depicts a wireless communication device and docking station. A mechanism detects when the wireless communication device is docked. The mechanism sends a signal from the docking station to the wireless communication device (WCD). The signal causes logic in the processor to accept input from the wireless communication device (e.g. the keypad) or from peripherals associated with the docking station. The signal also causes logic in the processor to display output on the WCD display or a display associated with the docking station when appropriate. Typically, data is transmitted in either of two formats. Wireless application protocol (WAP) is an example of a format typically used with cellular telephones and other wireless devices.

The origin of WAP can traced to 1995 when a European cellular telephone manufacturer began development of a protocol referred to as the Intelligent Terminal Transfer Protocol (ITTP) to facilitate the addition of services to cellular telephones. A corporation then-called Unwired Planet, a predecessor of Smart Messaging, created a competing protocol referred to as Handheld Device Markup Language. Although similar to HTML, HDLM was intended for use with devices with relatively small screens, such as hand-held computers, cellular telephones and PDAs. Thus, the objective of WAP is to provide users of hand-held wireless communications access to the Internet. However, as previously mentioned, a device downloading information from the Internet using WAP typically incorporates a smaller display area. When a larger display is available HTTP protocol is typically used. An objective of the present method is to provide an improved interface, including display, when a WCD is docked.

Figure 1A:
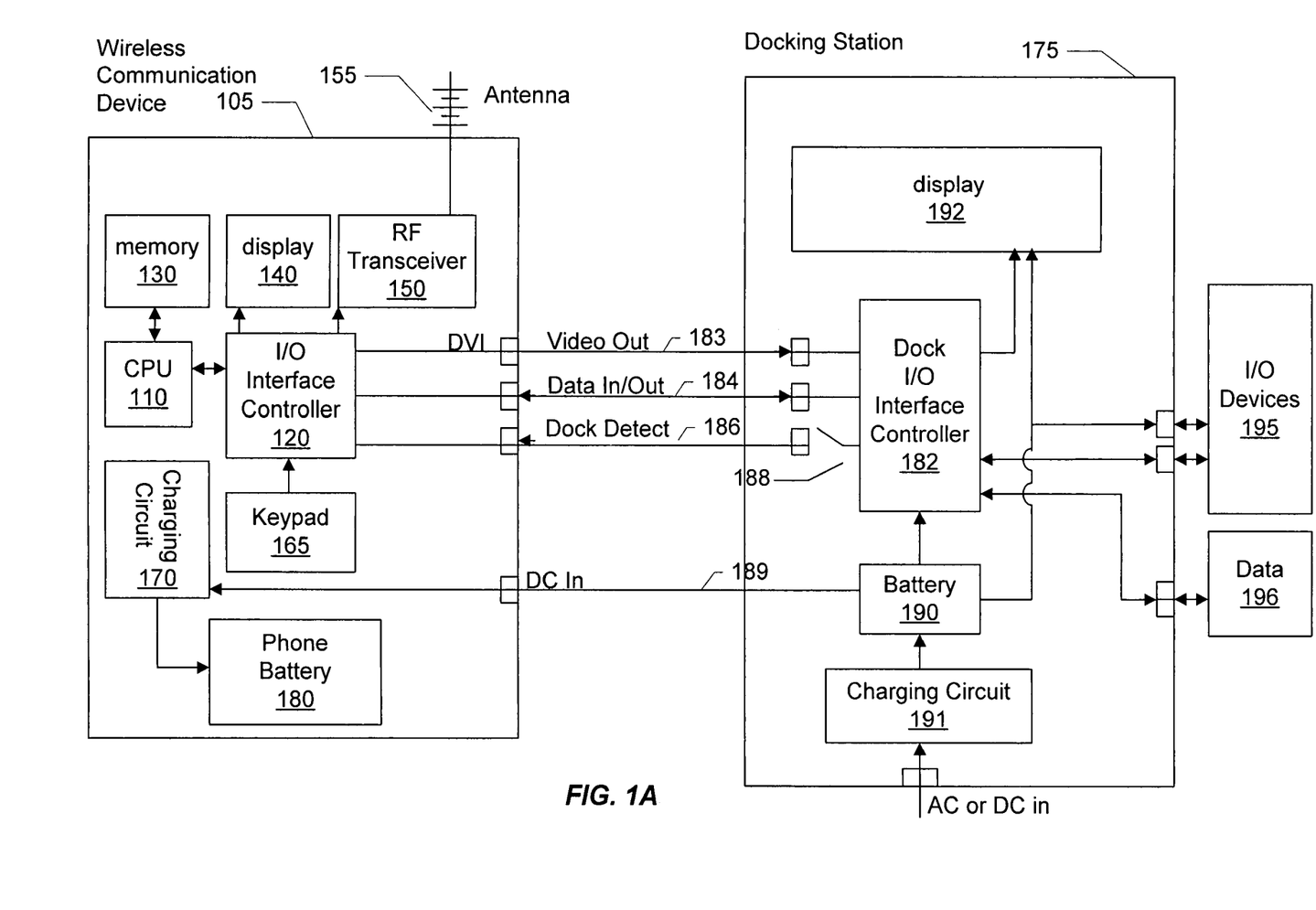
FIG. 1A is a block diagram of a wireless communication device and a docking station.

The wireless communication device 105 shown in FIG. 1A includes central processing unit (CPU) 110. CPU 110 performs processing required to provide instructions to the input/output interface controller 120 and to memory 130. Memory 130 stores software instructions and can also be a buffer for CPU 110. Input/out (I/0) interface controller 120 receives instructions from CPU 110, receives signals from keypad 160, and exchanges instructions with CPU 110. I/O interface controller 120 return information required for CPU 110 to perform certain functions. I/O interface controller 120 is also coupled to and sends and receives data streams to R/F transceiver 150. R/F transceiver 150 is coupled to antenna 155 which transmits and receives R/F signals. I/O interface controller 120 also transmits a video output to display 140. Display 140 can be of any commercially available type but is typically a liquid crystal display ("LCD"). CPU 110 also sends and receives signals to memory 130. Furthermore wireless communication device 105 comprises charging circuit 170 that provides the power to the device and also charges battery 180.

FIG. 1A also depicts the components of docking station 175 compatible with wireless communication device 105. Dock I/O interface controller 182 sends and receives data from I/O interface controller 120 in wireless communication device 105. Data can include video signals. In an embodiment, video signals are be transmitted through connector 183. In an embodiment, connector 183 can be of a type known as a Digital Video Interface (DVI) connector. In another embodiment, video signals are transmitted to the wireless communication device from a digital video camera connected to the dock I/O interface controller 182. In embodiment, data signals are transmitted from the dock to wireless communication device 105 through USB connector 184. Mechanism 188 detects when wireless communication device 105 is inserted into docking station 175 (i.e., is docked). When wireless communication device 105 is docked, a signal is sent from mechanism 188 to I/O interface controller 120. I/O interface controller 120 sends a corresponding signal (a dock detect signal) to CPU 110. In an embodiment, power from dock I/O interface controller 182 is transmitted to wireless communication device charging circuit 170. In another embodiment, power is sent from docking station battery 190 to wireless communication device charging circuit 170 through connection 189. Docking station charging circuit 191 is connected to docking station battery 190. Docking station charging circuit 191 accepts external power and provides a DC power supply to battery 190. Docking station battery 190 is coupled to, and provides power to, dock I/O interface 182, display 192 and USB hub 193.

Figure 1B:
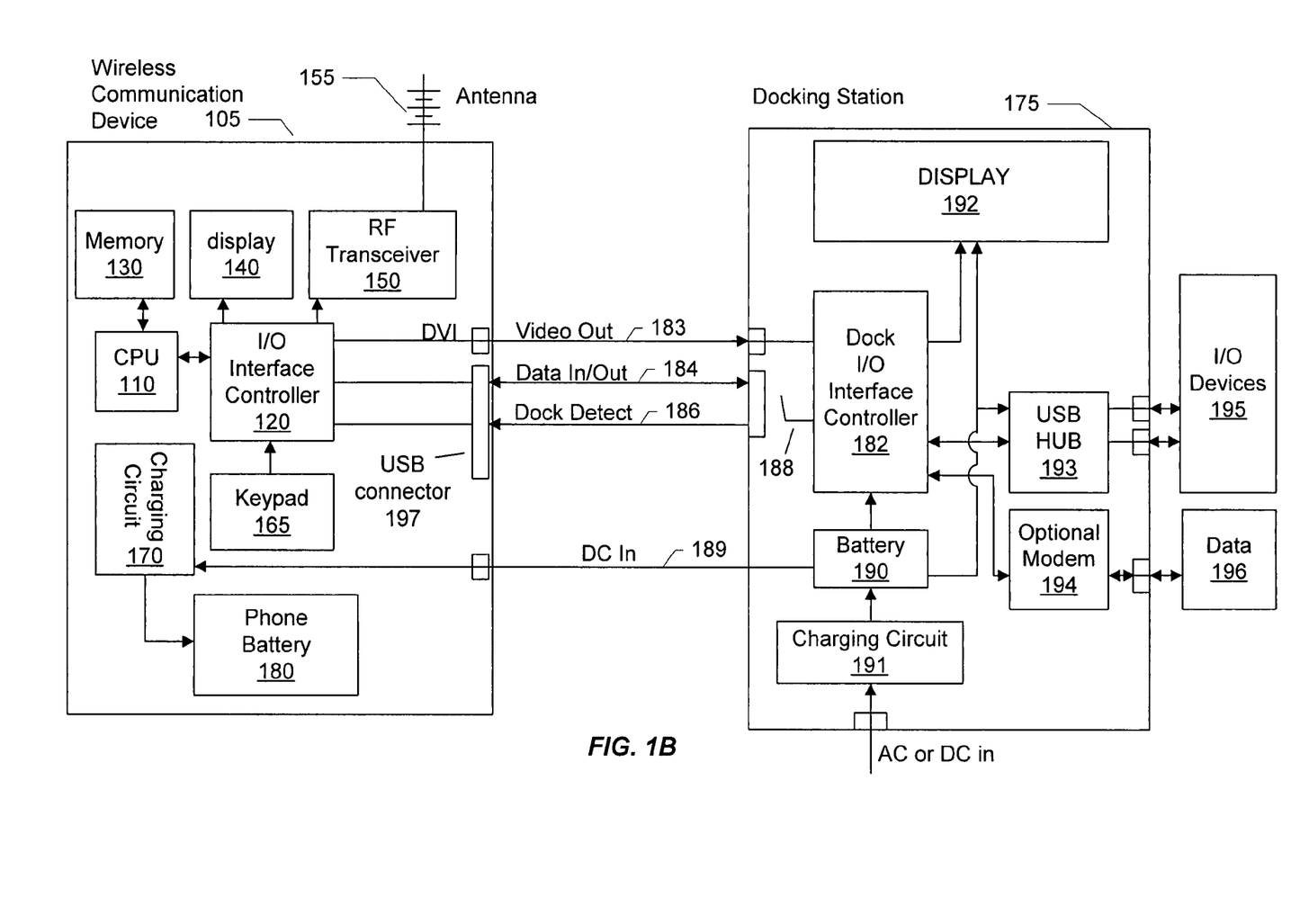
FIG. 1B is a block diagram of a wireless communication device and a docking station using a Universal Serial Bus connector and hub.

FIG. 1B depicts use of two embodiments. Referring to FIG. 1B, Dock I/O interface controller 182 sends video signals to display 192. Dock I/O interface controller 182 is also coupled to USB Hub 193 (not previously shown). USB hub 193 is coupled to external I/O devices. In an embodiment, USB hub 193 is coupled to external I/O devices through an USB connector. External I/O devices (not shown) keyboard, mouse, CD, floppy disk drive, camera, etc. In another embodiment USB connector 197 is included in wireless communication device 105.

Figure 1C:
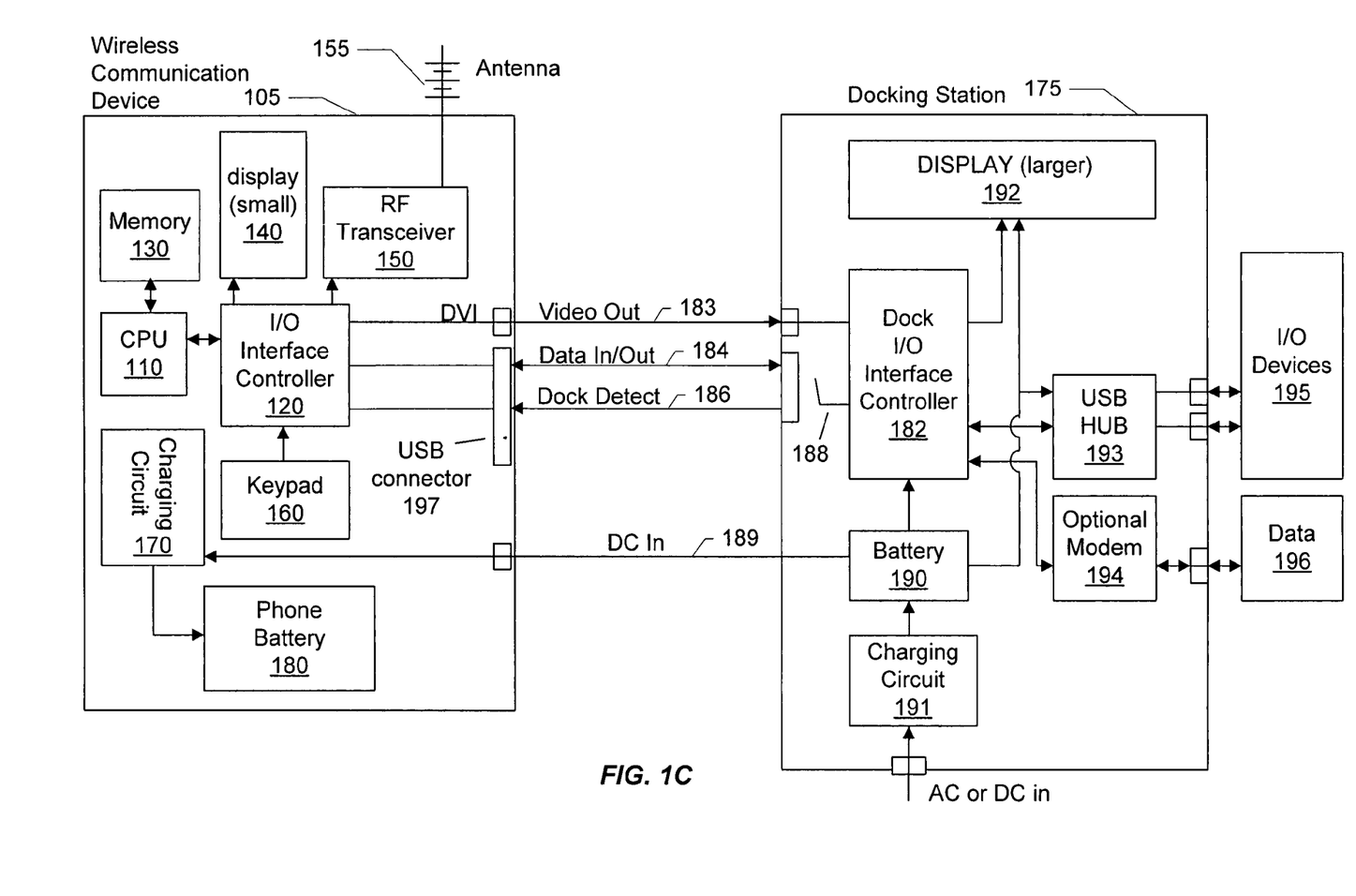
FIG. 1C is a block diagram of a wireless communication device and a docking station with a display larger than the docking station.
Figure 1D:
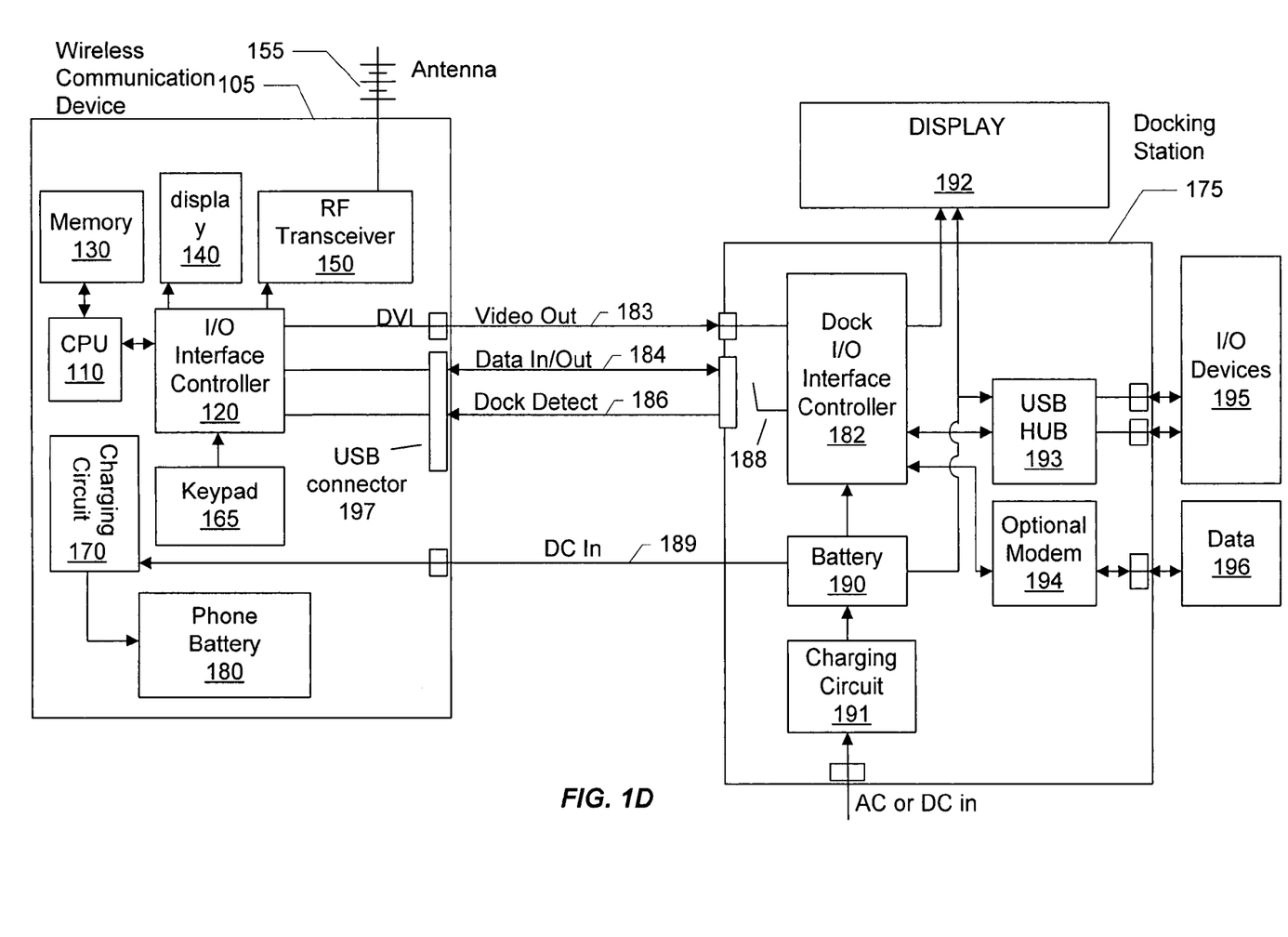
FIG. 1D is a block diagram of a wireless communication device and a docking station without a display.
Figure 4:
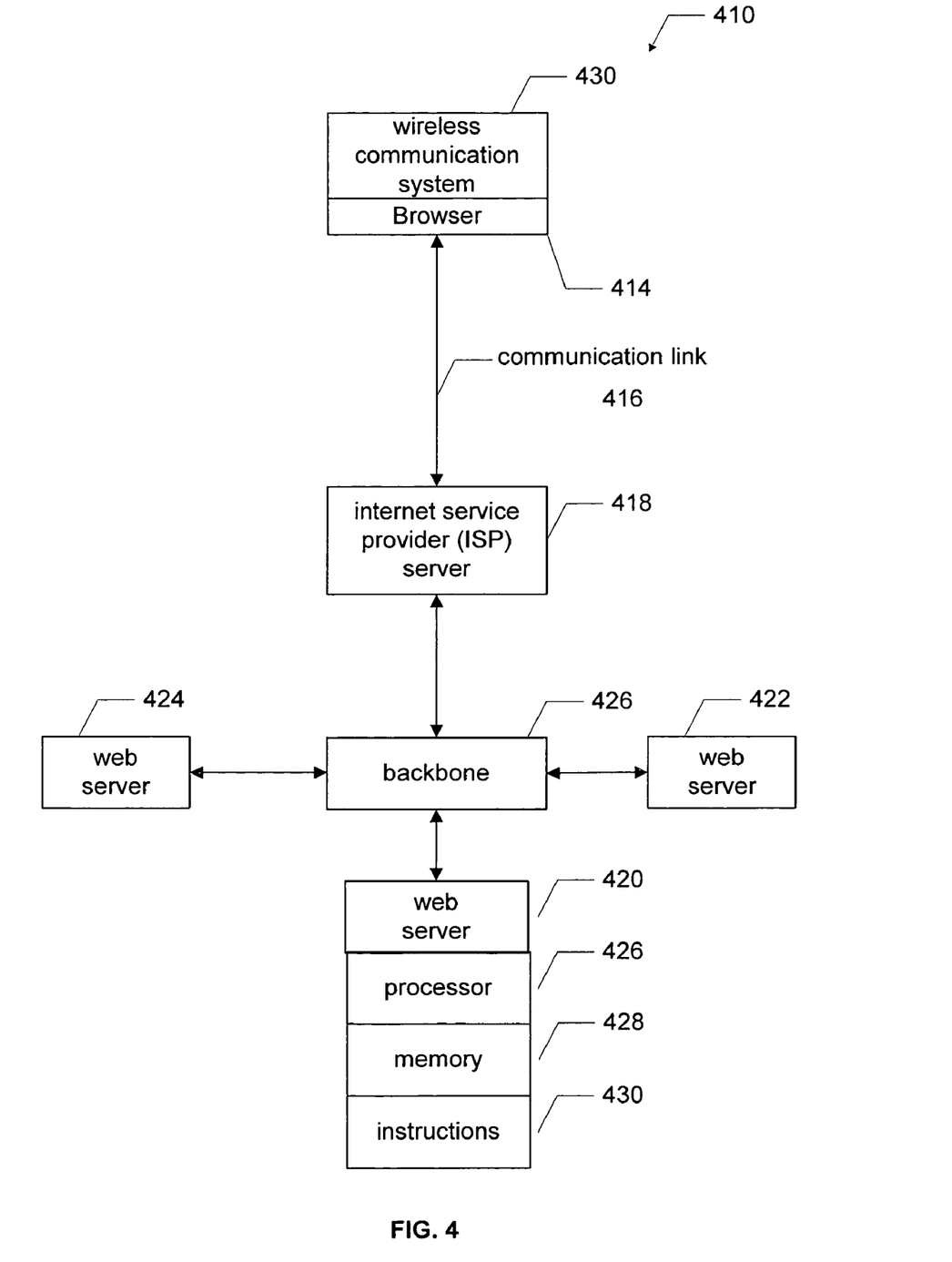
FIG. 4 is a line diagram depicting a network environment in which the present embodiments may operate.

FIG. 1B also depicts an embodiment including modem. Dock I/O interface controller 182 is coupled to modem 194. Modem 194 serves as a data interface between dock I/O interface controller 182 and a wired connection. For example, the wired connection can communicate data to an Internet service provider as shown in FIG. 4. FIG. 1C depicts a wireless communication device and a docking station with a display larger than the docking station. Under this scenario, data received from the data connection is displayed on the larger display in the docking station. FIG. 1D depicts a wireless communication device and a docking station without a display. Under this scenario, a separate display is coupled to the docking station as shown in FIG. 4.

Figure 2:
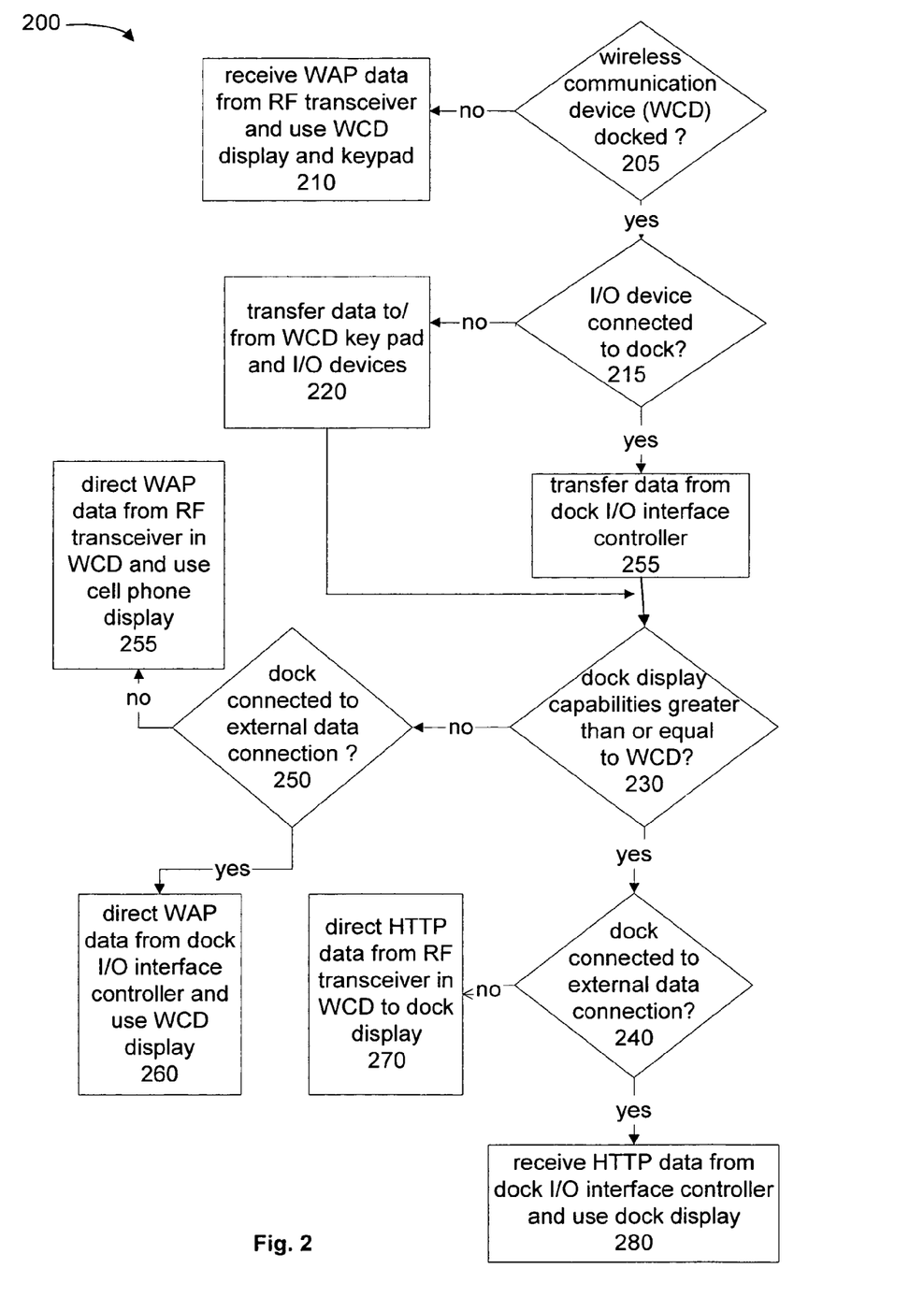
FIG. 2 is a flow diagram depicting logical steps of software instructions.

FIG. 2 depicts the I/O interface controller 120 logic. As shown in event 205, interface controller 120 detects if a dock-detect signal is received from mechanism 188. If I/O interface controller 120 is not receiving a dock-detect signal, then wireless communication device 105 receives WAP data from RF transceiver 150 and displays the data on wireless communication device display 140. If a dock-detect signal is received, then event 215 in I/O interface logic determines of an I/O interface device is connected to the dock. If no I/O interface device is connected to the dock, then data is transferred from WCD keypad 165 and other I/O devices in event 220. If event 215 determines that I/O devices are present in the dock, then data is transferred from dock I/O interface controller 182 in event 225.

Still referring to FIG. 2, at event 230, I/O interface controller 120 logic determines if the dock display capabilities are greater than or equal to the WCD display capabilities. If the dock display capabilities are less than WCD display capabilities, then logic 200 determines if the dock is connected to an external data connection, event 250. If event 250 determines the dock is not connected to an external data connection, then event 255 directs WAP data from RF transceiver 150 to WCD display 140. If event 250 determines the dock is connected to an external data connection then event 260 directs WAP data from dock I/O interface controller 182 to WCD display 140.

Still referring to FIG. 2, if at event 230 I/O interface controller 120 logic determines the dock display capabilities are greater than or equal to the WCD display capabilities, then event 240 determines if the dock is connected to external data connection 196. If event 240 determines the dock is not connected to external data 196 connection then HTTP data is sent from RF transceiver 150 to dock display 192. If event 240 determines the dock is connected to an external data connection 196 then, HTTP data is sent from I/O interface controller 182 dock display 192.

Figure 3:
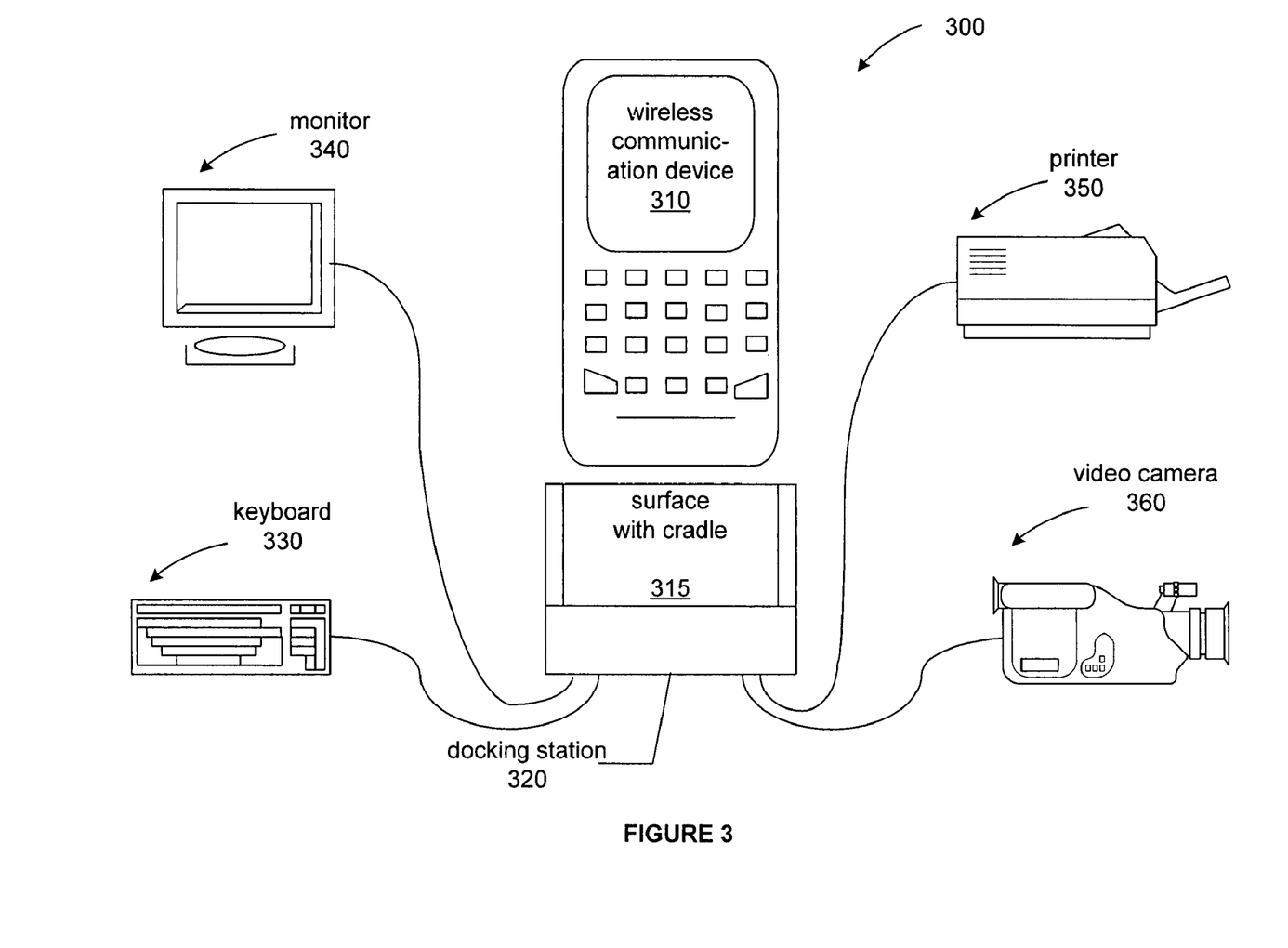
FIG. 3 is a block diagram of a wireless communication device, docking station and peripherals.

FIG. 3 depicts a wireless communication device 310 and docking station 320 corresponding to wireless communication device 105 and docking station 175 shown in FIG. 1. Docking station 320 includes surface with cradle 315. FIG. 3 also depicts connections to video camera 360, keyboard 330 and printer 350. Although only three peripheral devices are shown, the system supports a plurality of peripheral devices. Again wireless communication device 310 can be a cellular telephone, PDA, hand-held computer or other wireless communication device.

AN EXAMPLE COMMUNICATION NETWORK

When docked, the wireless communication device operates in a network environment similar to a conventional laptop or desktop personal computer system. An example of a typical conventional Internet connection is shown in FIG. 4. Wireless communication device 105 docked in docking station 175 constitutes a wireless communication system 430. Wireless communication system 430 executes an application program known as a web browser 414. Wireless communication system 430 establishes a communication link 416 with web server (ISP) 418. Communication link 416 may be effected as a dial-up wired connection with a modem, a direct link (such as a T1, ISDN or DSL line), or a wireless connection through a cellular or satellite network. When the user enters a request for information by entering commands in web browser 414, wireless communication system 430 sends a request for information, such as a search for documents pertaining to a specified topic, or a specific web page to web server 418. Each web server 418, 420, 422, 424 connected to the Internet has a known address which the user must supply to the web browser 414 in order to connect to the appropriate web server 418, 420, 422, or 424. If the information is available on the user's web server 418, a central link such as backbone 426 allows web servers 418, 420, 422, 424 to communicate with one another to supply the requested information. Web server 418 services requests for the information and receives information from (or transmits information to) wireless communication system 430.

One skilled in the art will recognize that the foregoing components and devices are used as examples for sake of conceptual clarity and that various configuration modifications are common. For example the Internet (a global public TCP/IP based communication network) has been used as an example of a network. However, the present disclosure is applicable to networks other than the Internet. For example, the apparatus taught is applicable to internal corporate networks (intranets), extensions of intranets to allow outside access (extranets) and private networks such as virtual private networks (VPN). Also, a wireless communication device is used to denote communications devices include cellular telephones, personal digital assistants (PDAs) and personal computers. In general, use of any specific exemplar herein is also intended to be representative of its class and the non-inclusion of such specific devices in the foregoing list should not be taken as indicating that limitation is desired.

While particular embodiments of the present disclosure have been shown and described, it will be obvious to those skilled in the art that, based upon the teachings herein, changes and modifications may be made without departing from this disclosure and its broader aspects, and therefore, the appended claims are to encompass within their scope all such changes, modifications and equivalents as are within the true spirit and scope of this disclosure. Furthermore, it is to be understood that the disclosure is solely defined by the appended claims.

The invention claimed is:

1. A docking system for a wireless communication device (WCD), having display capabilities, the docking system comprising:
  a docking station including a dock display, the docking station further comprising:
    a support structure including a first surface on which is disposed a cradle, the support structure further comprising:
      a detector mechanism, the detector mechanism detecting if Hypertext Transfer Protocol (HTTP) data is sent from an RF transceiver in the WCD to the dock display, or if Wireless Application Protocol (WAP) data is sent from the RE transceiver to the WCD display, the detector mechanism further detecting if:
the WCD is docked;
an I/O interface is connected to the docking station; and
dock display capabilities are greater than or equal to the WCD display capabilities.

2. The docking system for a WCD as recited in claim 1, wherein the WCD is a cellular telephone.

3. The docking system for a WCD as recited in claim 1, wherein the WCD is a personal digital assistant (PDA).

4. The docking system for a WCD as recited in claim 1, wherein the WCD is a personal computer.

5. The docking system for a WCD as recited in claim 1, wherein the docking station further comprises a connector, the connector coupling the docking station to the WCD.

6. The docking system for a WCD as recited in claim 5, wherein the connector is a Universal Serial Bus (USB) connector, wherein the USB connector electrically couples the docking station to the WCD.

7. The docking system for a WCD as recited in claim 5, further comprising:
a keyboard, wherein the keyboard is electrically coupled to the docking station.

8. The docking system for a WCD as recited in claim 5, further comprising:
a video camera, wherein the video camera is electrically coupled to the docking station.

9. The docking system for a WCD as recited in claim 5, further comprising:
a printer, wherein the printer is electrically coupled to the docking station.

10. The docking system for a WCD as recited in claim 5, further comprising:
a floppy disk drive, wherein the floppy disk drive is electrically coupled to the docking station.

11. The docking system for a WCD as recited in claim 10, further comprising:
a data connection to the Internet.

12. The docking system for a WCD as recited in claim 1, wherein the docking station further comprises:
a connector, wherein the connector couples the docking station to a data connection, wherein the data connection provides data to and receives data from the WCD when the WCD is docked.

13. The docking system for a WCD as recited in claim 1, wherein the docking station further comprises a modem.

14. The docking system for a WCD as recited in claim 13, wherein the modem is coupled to a data connection, wherein the data connection is coupled to the Internet.

15. The docking system for a WCD as recited in claim 1, wherein the docking station further comprises:
a dock I/O interface controller.

16. The docking system for a WCD as recited in claim 1, wherein the docking station further comprises:
a battery.

17. The docking system for a WCD as recited in claim 1, wherein the docking station further comprises:
a charging circuit.

18. The docking system for a WCD as recited in claim 1, wherein the WCD further comprises:
an I/O interface controller.

19. The docking system for a WCD as recited in claim 1, wherein the WCD further comprises:
a key pad.

20. A method of operating a wireless communications device (WOD) with a docking station, having display capabilities, comprising:
providing a docking station including a dock display, the docking station having a support structure including a cradle;
providing a detector mechanism in the support structure, the detector mechanism detecting if Hypertext Transfer Protocol (HTTP) data is sent from an RF transceiver in the WCD to the dock display, or if Wireless Application Protocol (WAP) data is sent from the RE transceiver to the WCD display, the detector mechanism further detecting if:
the WCD is docked;
an I/O interface is connected to the docking station; and
dock display capabilities are greater than or equal to the WCD display capabilities.

* * * * *

UNITED STATES PATENT AND TRADEMARK OFFICE
CERTIFICATE OF CORRECTION

| | | |
|---|---|---|
| PATENT NO. | : 7,076,270 B2 | Page 1 of 1 |
| APPLICATION NO. | : 09/796041 | |
| DATED | : July 11, 2006 | |
| INVENTOR(S) | : Christopher M. Jaggers and Robert L. McMahan | |

It is certified that error appears in the above-identified patent and that said Letters Patent is hereby corrected as shown below:

Title Page #63

Under "Related U.S. Application Data"

Delete "Continuation of application No. 09/796,041, filed on Feb. 28, 2001."

In the specification:

Column 1, line 7, delete ", and claims benefit of,"

Column 2, line 31, delete "Co-pending"

In the claims:

Claim 1, Column 7, line 1, change "RE" to --RF--

Claim 20, Column 8, line 26, change "(WOD)" to --(WCD)--

Signed and Sealed this

Twenty-first Day of November, 2006

JON W. DUDAS
*Director of the United States Patent and Trademark Office*